Patented Jan. 12, 1954

2,665,987

UNITED STATES PATENT OFFICE 2,665,987

ATTRACTANTS FOR CATTLE FEEDS

Willard E. Baier, Ontario, Calif., assignor to Sunkist Growers, Inc., Los Angeles, Calif., a corporation of California No Drawing. Application August 2, 1951,
Serial No. 240,055

14 Claims. (Cl. 99—2)

This invention relates to means and methods for improving the palatability of certain animal feeds, particularly those which are low in natural carotene contents such as dried lemon and grapefruit pulp. The invention in its broadest aspect, may be said to reside in the addition to the feed material of a small proportion of a violet-smelling alicyclic ketone, such as $\beta$-ionone.

For many years the waste citrus peel and pulp which normally accrues from the manufacture of citrus juices and other products from the fresh fruit has been utilized as a cattle feed. In the beginning such pulp was utilized in the wet state. However, the wet pulp is subject to bacterial and fungal decomposition, and is bulky and uneconomical to transport, inasmuch as it normally contains about 85% water. In order to overcome these difficulties, various methods have come into use over the years for drying the material. The resulting dried pulps are relatively stable and have become widely used in recent years as a predominantly carbohydrate feedstuff for cattle.

Those concerned with the manufacture and feeding of these citrus pulps have observed for some time that the dried feeds prepared from orange pulp were more palatable to cattle than dried lemon or grapefruit pulps. The orange pulps are in fact generally well liked, while in some cases, dried lemon pulps will be refused, or eaten only sparingly. This difference in apparent palatability cannot be accounted for on the basis of mere differences in sugar content or bitter content of the pulps. It is well known on the other hand that cattle are, in general, very fond of carotene-rich feeds such as alfalfa. It will be observed also that the coloring material of oranges consists largely of various carotenes, particularly $\beta$-carotenes, while the pigment of lemons and grapefruit consists predominantly of xanthins with only a small proportion of carotenes. It may then be hypothesized that cattle prefer the dried orange pulps because of their higher carotene content. If this is true, the questions may be asked as to how animals perceive the presence of carotenes in the feed, and whether it is the carotene itself or some factor psychologically associated therewith which causes carotene-rich feeds to be relished.

$\beta$-carotene is well known as the natural precursor of vitamin A, which is apparently produced therefrom in the animal organism by a hydrolytic enzyme. It is fairly well established also that $\beta$-carotene consists chemically of two reduced $\beta$-ionone residues joined together by an unsaturated aliphatic hydrocarbon chain. Under certain conditions which promote oxidation, as for example in the presence of certain enzymes, or merely by the action of light, and perhaps other factors such as heat, $\beta$-carotene is known to undergo oxidation, with the resultant formation of $\beta$-ionone. The odor of $\beta$-ionone can in fact often be detected in dehydrated carotene-containing vegetable materials such as carrots.

It may therefore be surmised that cattle initially react to the presence of $\beta$-carotene in feeds through the odor of its oxidation product, $\beta$-ionone, and would tend to associate any ionone-smelling feed with previously experienced carotene-rich feeds such as alfalfa and orange pulp, which are well liked. Inasmuch as citrus pulps, before, during or after drying, may be subject to any or all of the above conditions favoring oxidation, or perhaps to others, there is substantial reason to believe that any $\beta$-carotene present may be partially decomposed to produce $\beta$-ionone in the final product. It is therefore a plausible hypothesis that, in the case of those dried citrus pulps low in natural carotenes, the absence of the odoriferous $\beta$-carotene decomposition products may account for the lesser acceptability of those materials to cattle.

Whether the above hypothesis is correct or not, as it may well not be, I have found that if a very small amount of $\beta$-ionone, or other violet-smelling alicyclic ketone, is admixed with dried lemon pulp or dried grapefruit pulp, such treated pulp is more readily accepted by cattle than similar pulp not treated with ionones.

In view of the foregoing, it will be seen that the principal objective of my invention is to provide means and methods whereby animal feeds low in natural carotenes, or in their odoriferous oxidation products, may be rendered more readily acceptable and hence palatable to cattle.

A more specific object of the invention is to provide means and methods whereby dried lemon pulps may be rendered comparably palatable to dried orange pulps.

Other objects and advantages of my invention will be apparent from the detailed description which follows.

My basic process is applicable to any feed material, either dried or undried which, because of its low carotene content, or the odorous oxidation products thereof, is unappetizing to cattle or other animals. This category includes feeds which are or may originally have been rich in carotenes, but wherein those carotenes are rendered ineffective as an attractant to cattle through any of various causes, such as the lack of sufficient oxidizing conditions to produce an effective ionone odor, or the premature oxidation thereof, and vaporization of the oxidation products. It will be appreciated therefore, that basically my process is applicable to any feed material which, at the time of feeding, is found to be deficient in attractive odorants such as ionone. This may at times include orange pulps.

However, as has been previously indicated, I am primarily concerned with those dried citrus materials such as lemon pulp and grapefruit pulp which are low in natural carotenes. These pulps are nutritionally substantially equal, except in carotene content, to the more appetizing orange pulps, and it is accordingly highly desirable to render them equally acceptable as a feed. The lack of carotene in these feeds is not however totally disadvantageous, because, for some purposes, finishing beef cattle for instance, high carotene feeds may produce yellow fat in the meat, which is considered undesirable from the standpoint of consumer acceptance. My invention provides an economical substitute for some of the desirable attributes of carotenes, while avoiding the undesirable production of yellow colored fat.

In manufacturing the dried citrus pulps, any suitable method may be utilized for drying. The wet pulp may simply be air-dried by spreading it over an open space where it may be exposed to the sun and atmosphere. A generally more satisfactory method of drying consists in passing the comminuted wet pulp through a rotary drying oven. If desired, the wet pulp may first be treated with certain well known chemicals and/or enzymes to cause coagulation of the pectous materials contained therein, after which part of the water may be mechanically expressed from the pulp. The most commonly used agent for coagulating pectous and other gelatinous materials is lime, the use of which goes back almost to antiquity. These preliminary treatments form no part of my present invention.

It is, however, important to my invention to avoid producing a visibly burned or browned dried product. It often happens that the temperature and time during which the pulp is maintained in the heated drier are not adequately controlled, and as a result the dried meal obtained is brown in color. Such browned pulp is consistently and definitely disliked by cattle, presumably because the burning process must produce unattractive odorants. The unburned dried meal has a light gray color, and hence the temperature and time during which the pulp is maintained in the drier, as well as its state of agitation therein, should be so controlled as to yield a product having a light gray color.

After the pulp has been dried and cooled, the ionone or other odorant may be added in any suitable manner. In view of the very powerful odor of the ionones, it is ordinarily preferable to dilute them with an inert solvent so that they may be more readily distributed or dispersed within the pulp. I may either use a volatile solvent or a nonvolatile solvent. Suitable volatile solvents include for example isopropyl alcohol or ethyl alcohol. Under some conditions a nonvolatile solvent may be preferred which will also act as a fixative. If the feed material is to be stored for long periods of time, or in warm places, the added odorant may tend to evaporate too quickly, and to help prevent this it may be added to the pulp in a nonvolatile oil such as cottonseed oil, or other edible oil.

The odorant may be added by spraying or dripping onto a moving stream of the pulp in a conveyor, such as a screw conveyor. It may also be added after the material has been sacked, as it usually is, into 100-pound bags. In this case a long syringe may be used to inject a measured portion of the material into the interior of the bag. No particular care need be exercised to distribute the odorant evenly throughout the pulp, inasmuch as ordinary diffusion in storage will partially take care of this problem, and the stirring and agitation which occurs when the pulp is poured out for use will ordinarily be sufficient to insure adequate mixing.

The amount of ionone or other odorant to be used is not critical and may vary over a wide range. When using $\beta$-ionone only one part, or a few parts per million by weight of dried pulp may be quite effective, and this quantity may range upwardly to one hundred parts per million or slightly more. Larger quantities should be used when long or severe storage conditions are contemplated which might result in considerable evaporation prior to use. Inasmuch as the odorants vary in their inherent strength and purity as obtained commercially, and in view of variable pre-evaporation conditions encountered in storage, no precise limits can be set upon the quantities which may be used. I simply use enough of these materials in all cases to reach the odor threshold, and preferably to provide a noticeable odor emanating several inches from the surface of the pulp. The strength of the odor so emanating should not however be so great as to be repulsive to the cows, or to paralyze the olfactory sense.

As has been previously stated, the odorant employed may consist of any alicyclic ketone having a violet like odor. This group includes for example $\beta$-ionone, $\alpha$-ionone, the various methyl ionones, and various commercial mixtures of these materials. Any of these materials, though not identical in odor character to the decomposition products of $\beta$-carotene, are similar enough thereto to serve the desired purpose. All of these ionones are very powerful odorants having basically a violet character, but with certain woody or hay-like overtones.

The following examples are given in order to illustrate the manner in which my invention may be practiced, and should not be interpreted as limitative.

*Example 1*

One thousand parts of a light colored dried lemon pulp are placed in a suitable container. Over the surface of the pulp is then sprinkled .027 part by weight of $\beta$-ionone in the form of a 10% solution in isopropyl alcohol. The ionone solution should be distributed over the top of the material as evenly as may be possible. The container is then closed and the contents shaken up thoroughly in order to obtain a fairly even admixture of the materials. The closed container may then be allowed to stand at room temperature for several days in order to permit the $\beta$-ionone to diffuse more thoroughly throughout the material.

A sample of odorized pulp prepared as outlined above was used in feeding experiments, along with samples of the same untreated pulp. The cows were reported to show a very definite preference for the ionone treated pulp.

The proportions recited above will be seen to provide 27 parts per million of $\beta$-ionone in the dried pulp at the time of mixing. Inasmuch as the treated pulp was necessarily exposed to the atmosphere for a short time before feeding, the amount of ionone present when the feed was placed before the cows was probably somewhat less than 27 parts per million.

*Example 2*

A liquid metering device is mounted above a screw conveyor which conveys dried and cooled lemon pulp from a rotary oven drying plant to a packing shed. A 10% solution of β-ionone in isopropyl alcohol is supplied to the metering device which is adjusted to drip the solution onto the moving pulp at a rate sufficient to provide the desired amount of β-ionone in the pulp. Added in this manner the β-ionone is thoroughly admixed with the pulp by the time it reaches the packing shed and is sacked into 100 pound bags.

By operating in a manner somewhat similar to the above, I have in one case admixed β-ionone, dried lemon pulp, and dried grapefruit pulp to provide initially 126 parts by weight of β-ionone per million parts of mixed pulp. This mixture was exposed to the atmosphere for a considerable time during and after mixing, and hence probably lost some β-ionone by evaporation. The material was however used in feeding tests by placing piles of the treated pulp on the ground, alternating with piles of the untreated pulp. Four cows were admitted to the testing ground and allowed free access to the piles of feed. It was observed that the cows consumed first the odorized pulp and then the untreated pulp, indicating a definite preference for the former.

I designate herein materials low in carotenes as those which contain appreciably smaller amounts of carotene than do fresh oranges. Oranges very widely in carotinoid content, especially geographicwise, and have been reported to contain from 18 to 90 parts per million by dry weight of carotinoids in the fleshy parts of the fruit, and from about 3 to 16 parts per million in juice solids. The materials which I designate herein as "low in odorous carotene oxidation products" are those which contain insufficient of such odorants, particularly β-ionone, to be attractive to cattle, or any such material, the attractiveness of which may be improved by the addition of ionone.

From the above it will be seen that I have provided a method whereby certain apparently unpalatable feed materials may be rendered substantially as attractive to cattle as other feedstuffs of similar nutritional value, but differing therefrom in carotene content. While I have described my invention with particular reference to certain specific embodiments, I do not wish to be limited to those particular details, but only broadly as set forth in the following claims.

I claim:

1. A process for increasing the palatability of animal feeds low in odorous carotene oxidation products which comprises incorporating therein a small proportion of a violet-smelling alicyclic ketone.

2. A process for increasing the palatability of a dried, low-carotene animal fodder which comprises incorporating therein a small proportion of a violet smelling ionone.

3. A process for increasing the palatability of a dried, low-carotene animal fodder which comprises incorporating therein a small proportion of β-ionone.

4. A process for increasing the palatability of a dried citrus pulp cattle feed low in odorous carotene oxidation products which comprises incorporating therein a small proportion of a violet-smelling alicyclic ketone.

5. A process for increasing the palatability of an oven dried citrus pulp cattle feed low in natural carotenes which comprises incorporating into said feed after drying a small proportion of a violet smelling ionone.

6. A process for increasing the palatability of a dried lemon pulp cattle feed which comprises incorporating therein a small proportion of a violet-smelling alicyclic ketone.

7. A process for increasing the palatability of a dried lemon pulp cattle feed which comprises incorporating therein a small proportion of a violet smelling ionone.

8. A process for increasing the palatability of a dried lemon pulp cattle feed which comprises incorporating therein a small proportion of β-ionone.

9. In a process for the manufacture of a palatable dried cattle feed from lemon pulp, the steps of maintaining the prepared, comminuted lemon pulp in an oven under such controlled conditions of time, temperature and agitation as to reduce its moisture content to below about 15% without scorching or burning, and thereafter admixing with the dried pulp a small proportion of a violet-smelling alicyclic ketone.

10. A process for increasing the palatability of a dried grapefruit pulp cattle feed which comprises incorporating therein after drying a small proportion of a violet smelling ionone.

11. A dried citrus pulp cattle feed low in natural carotenes containing a small proportion of an added violet smelling alicyclic ketone.

12. A dried citrus pulp cattle feed low in natural carotenes containing a small proportion of added β-ionone.

13. A dried lemon pulp cattle feed containing a small proportion of an added violet-smelling alicyclic ketone.

14. A dried lemon pulp cattle feed containing a small proportion of added β-ionone.

WILLARD E. BAIER.

References Cited in the file of this patent

UNITED STATES PATENTS

| Number | Name | Date |
|---|---|---|
| 2,548,510 | Neal | Apr. 10, 1951 |

OTHER REFERENCES

"Chemical Dictionary," by Hackh, 3rd edition, 1944, page 448.